United States Patent
Van Otterloo

(10) Patent No.: US 11,582,947 B2
(45) Date of Patent: Feb. 21, 2023

(54) CATTLE WATER FOUNTAIN

(71) Applicant: David Van Otterloo, Hull, IA (US)

(72) Inventor: David Van Otterloo, Hull, IA (US)

( * ) Notice: Subject to any disclaimer, the term of this patent is extended or adjusted under 35 U.S.C. 154(b) by 377 days.

(21) Appl. No.: 16/697,633

(22) Filed: Nov. 27, 2019

(65) Prior Publication Data
US 2020/0163308 A1   May 28, 2020

Related U.S. Application Data

(60) Provisional application No. 62/771,868, filed on Nov. 27, 2018.

(51) Int. Cl.
*A01K 7/02* (2006.01)
*A01K 7/04* (2006.01)
*A01K 7/06* (2006.01)

(52) U.S. Cl.
CPC ............. *A01K 7/027* (2013.01); *A01K 7/025* (2013.01); *A01K 7/04* (2013.01); *A01K 7/06* (2013.01)

(58) Field of Classification Search
CPC . A01K 7/00; A01K 7/02; A01K 7/027; A01K 7/06
USPC .......... 119/51.5, 72–74, 77, 79–81
See application file for complete search history.

(56) References Cited

U.S. PATENT DOCUMENTS

| | | | |
|---|---|---|---|
| 2,446,695 A * | 8/1948 | Didget | A01K 39/02 119/74 |
| 3,368,580 A * | 2/1968 | Carter | C02F 1/686 137/412 |
| 3,650,247 A * | 3/1972 | McKinstry | A01K 39/022 119/81 |
| 4,397,266 A * | 8/1983 | Noland | A01K 7/06 119/73 |
| 4,630,569 A * | 12/1986 | Dieleman | A01K 45/002 119/69.5 |
| 4,646,687 A | 3/1987 | Peterson et al. | |
| 4,856,459 A * | 8/1989 | Wiseman | A01K 7/027 119/73 |
| 6,463,880 B1 * | 10/2002 | Callingham | A01K 7/04 119/78 |
| 8,104,431 B2 * | 1/2012 | Klenotiz | A01K 7/06 119/72 |
| 8,381,686 B2 * | 2/2013 | Spiegel | A01K 7/00 119/74 |
| 8,464,661 B1 * | 6/2013 | Dunn | A01K 7/02 119/73 |
| 8,777,044 B1 * | 7/2014 | Raymus | A47G 19/2272 220/526 |

(Continued)

FOREIGN PATENT DOCUMENTS

CN    202638060 U    1/2013

*Primary Examiner* — David J Parsley
(74) *Attorney, Agent, or Firm* — McKee, Voorhees & Sease, PLC

(57) ABSTRACT

A livestock water fountain comprises a first water chamber, a water inlet near the bottom of the first water chamber, and a thermostat in the first water chamber position above the inlet adjacent a preset low-water level in the chamber so as to measure the temperature of the water near the surface of the water. The fountain maybe divided into dual chambers with a wall having a lower passageway for fluid communication which can be plugged to limit water to one of the chambers when water consumption decreases in cold weather.

2 Claims, 8 Drawing Sheets

(56) References Cited

U.S. PATENT DOCUMENTS 9,179,652 B2 * 11/2015 Huber .................. A01K 45/002
2015/0150215 A1 * 6/2015 Pumphrey .............. A01K 7/027
119/73

* cited by examiner

CATTLE WATER FOUNTAIN

CROSS-REFERENCE TO RELATED APPLICATIONS

This application claims priority under 35 U.S.C. § 119 to provisional application Ser. No. 62/771,868, filed Nov. 27, 2018, herein incorporated by reference in its entirety.

BACKGROUND OF THE INVENTION

Water fountains for providing water to livestock are well known and come in many various forms. Fountains can be used in a barn or outside, and are plumbed to a water supply, with the valve to provide automatic filling of the trough of the fountain. In cold climates, these cattle water fountains are insulated and/or heated to prevent freezing of the water in the trough. Fountains can be a single drinking station for one cow or can have multiple drinking stations for more than one cow. However, the multi-station designs utilize more electricity during cold weather to keep larger volumes of water from freezing, even though the cattle drink less water in cold weather. The larger fountains also utilize multiple heating elements, which increase operational costs during cold weather.

Cattle have a tendency to drop feed and other miscellaneous debris into the fountains, which also increases electrical costs due to the debris on the bottom of the trough which absorbs heat that otherwise would be absorbed by the water. Conventional cattle water fountains also are not energy efficient due to insufficient insulation for use in cold weather climates.

Conventional cattle water fountains also utilize a thermostat at a position near the bottom of the water trough, spaced further from the colder water at the top of the trough, such that the surface of the water may freeze without sensing by the thermostat, and without actuation of the heating elements in a timely manner to prevent freezing of the water surface.

Accordingly, there is a need for an improved cattle water fountain which overcomes the problems of the prior art.

Therefore, a primary objective of the present invention is the provision of an improved cattle water fountain which can be effectively and efficiently used in cold weather without the risk of water freezing.

Another objective of the present invention is a provision of a heated cattle water fountain having dual drinking stations, with the option of sealing off one of the stations during colder weather when animals consume less water.

A further objective of the present invention the provision of a cattle water fountain which circulates the water in a trough to eliminate or minimize the risk of freezing water.

Another objective of the present invention the provision of a heated cattle water trough having a thermostat mounted high in the trough adjacent the normal water level so as to sense the temperature of the coldest water in the trough.

Still another objective of the present invention is a provision of a cattle water fountain having a water inlet adjacent the bottom of the trough and with a sprayer to flush debris away from the heating elements.

Still another objective of the present invention is a provision of a cattle water fountain with insulation on the exterior of the trough.

Yet another objective of the present invention is the provision of a livestock water trough which is economical to manufacture, and efficient and safe in use.

These and other objectives become apparent from the following description of the invention.

SUMMARY OF THE INVENTION

The livestock water fountain includes an outer shell having opposite sides, opposite ends, and being open on the top and bottom. A trough sits inside the shell, and has opposite sides and a bottom, and is open on the top. A water inlet supplies water into the trough when the water level is below a predetermined level. The trough may have one or more drinking chambers. For a dual chamber trough, a dividing wall between the chambers includes a lower opening or passageway which provides fluid communication between the chambers. The passageway can be closed or plugged so that only one of the chambers contains water, such as in cold weather when animals consume less water. Heating elements are provided on the bottom exterior of the troughs. The fountain also includes an air space adjacent at least one of the drinking stations. Insulation can be provided on the exterior of the trough. A float valve connected to the water inlet automatically supplies water to the trough when the water level drops below a preset level.

A water overflow pipe in the trough drains excess water to the exterior of the water fountain.

DETAILED DESCRIPTION OF THE INVENTION

Figure 6:
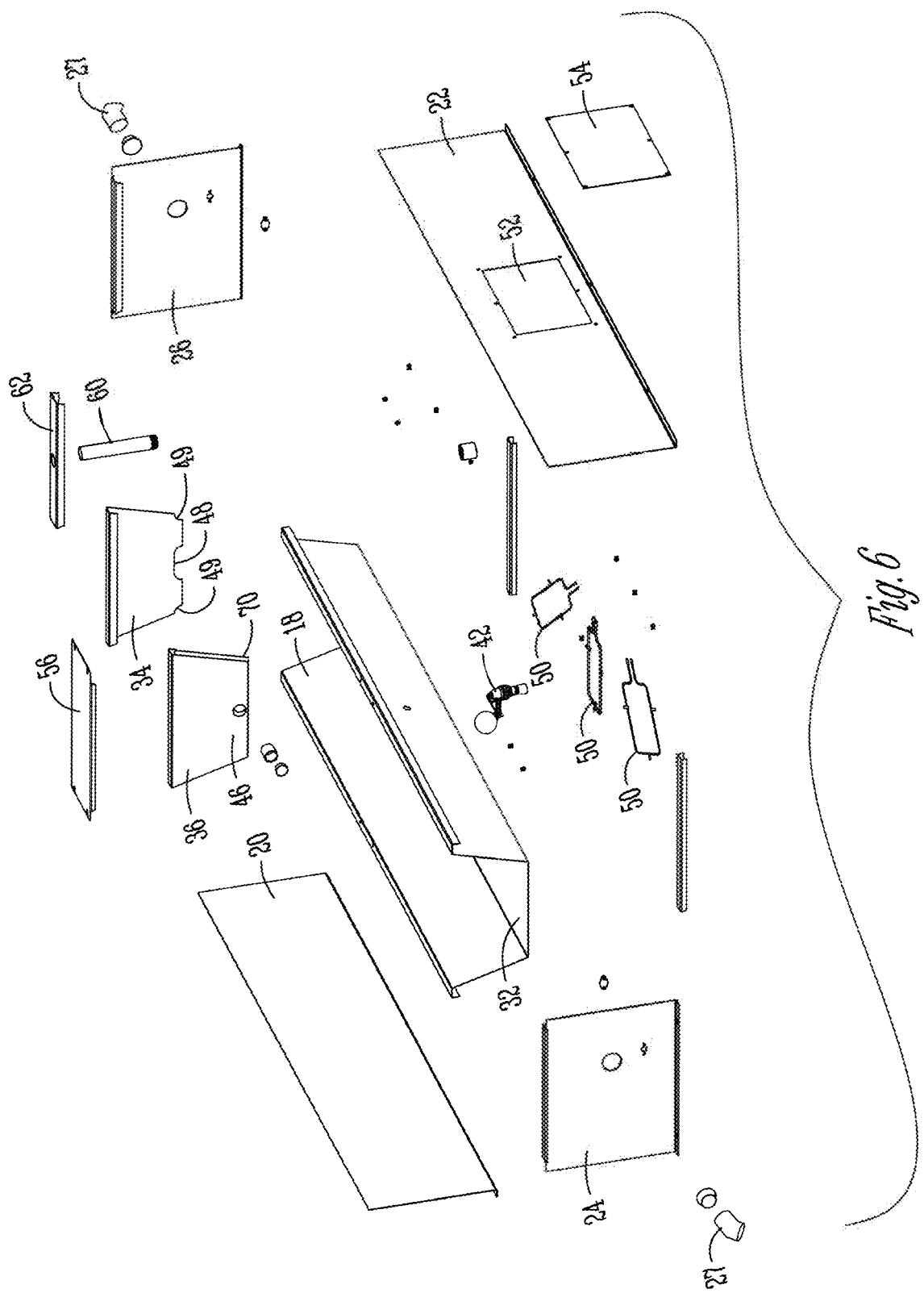
FIG. 6 is an exploded view of the water fountain.
Figure 7:
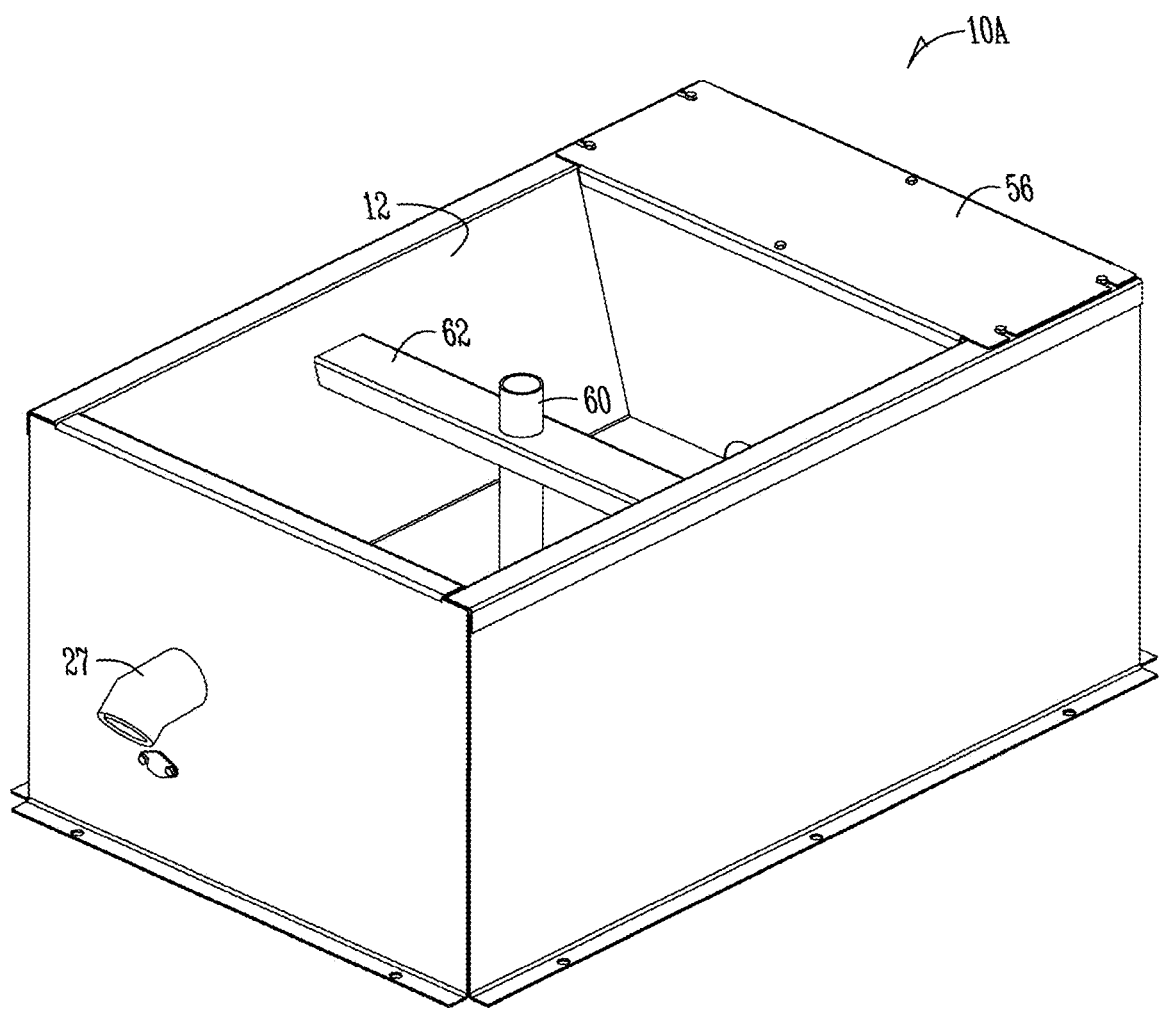
FIG. 7 is a perspective view of an alternative embodiment of the cattle water fountain, according to the present invention, and having a single drinking station.
Figure 8:
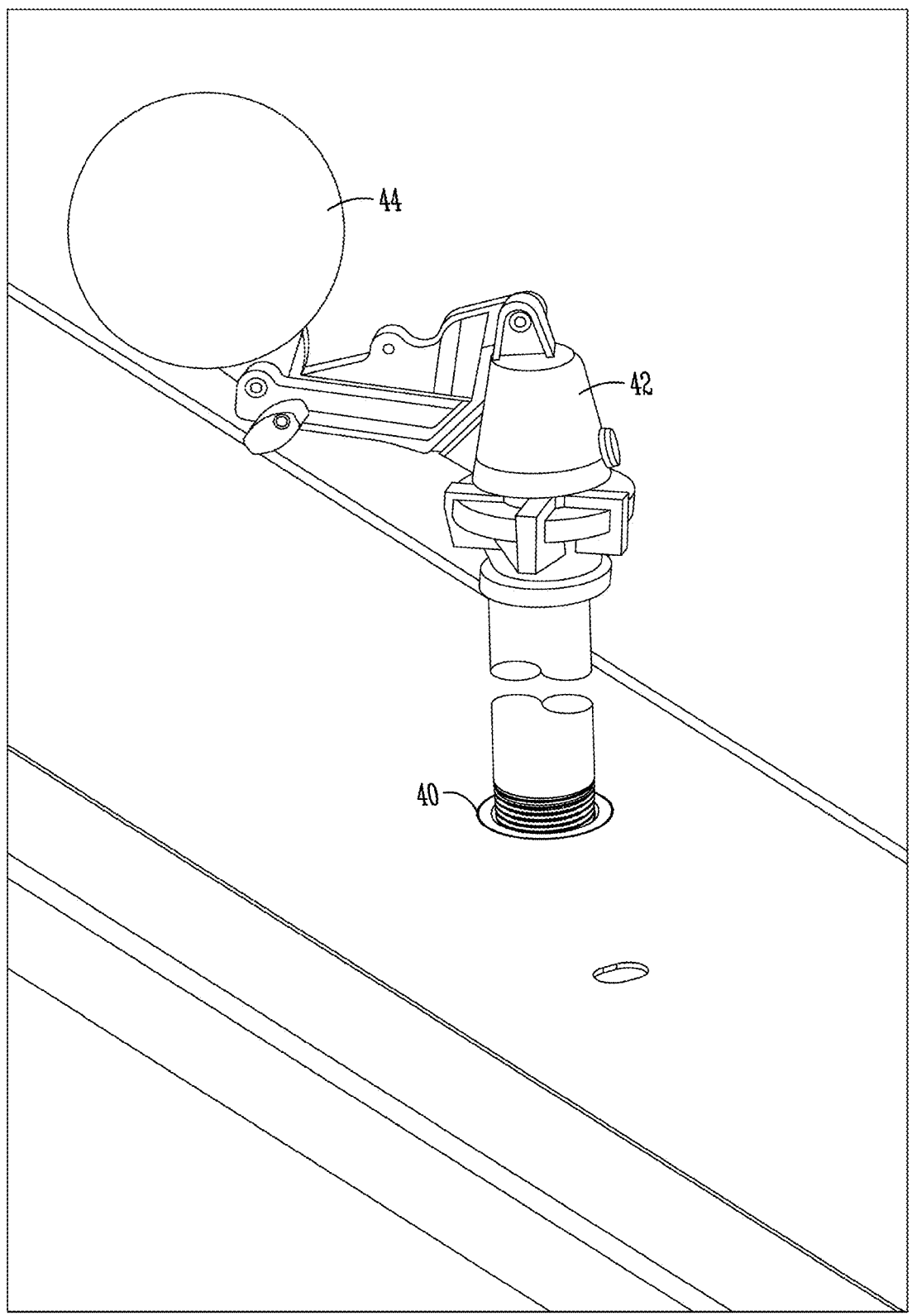
FIG. 8 is an enlarged view showing the water inlet in the bottom of the trough.

A first embodiment of the cattle water fountain is designated by the numeral 10 in FIGS. 1-6. A second embodiment of the fountain 10A is shown in FIG. 7. The primary difference between the fountain 10 and the fountain 10A is the number of drinking stations. More particularly, fountain 10 includes two drinking stations 12, 14, whereas the fountain 10A only has a single drinking station 12. Otherwise, the structures of the fountains 10, 10A are substantially identical.

The fountains 10 and 10A each includes an outer shell 16 and an inner trough 18. The shell 16 includes a front wall 20, a rear wall 22, and opposite end walls 24, 26, with an open bottom and an open top. The trough 18 is fixed within the walls of the shell 16. The trough 18 includes front and rear walls 28, 30 and a bottom wall 32. The ends of the trough 18 are open and closed by the end walls 24, 26 of the shell 16, as best seen in FIG. 6. Thus, the shell 16 and trough 18 form a double-walled container, except on the ends which may be a single wall.

The trough 18 includes a pair of vertical interior walls 34, 36, which divide the trough 18 into the first and second drinking stations, 12, 14. The walls 34, 36 are spaced from one another so as to define a cavity 38 therebetween. A water line 40 connected to a water source (not shown) has an outlet 41 to provide water to the cavity 38. A valve 42 controls the water supply to the trough 18. A shut-off float 44 allows the valve 42 to open when the water level is below a desired depth in the trough 18 and closes the valve 42 when the water level reaches the desired depth in the trough 18.

The interior wall 34 includes an opening at the bottom which is open when both drinking stations 12, 14 are filled with water. In colder weather, when cattle consume less water, the opening can be closed with a plug 46 so as to close off the second drinking station 14, so that only the first drinking station 12 is filled with water from the water line 40.

The interior wall 36 includes an enlarged or elongated opening 48 at the bottom. The opening 48 allows water from the inlet 40 to flush away debris which settles at the bottom of the trough 18.

Figure 1:
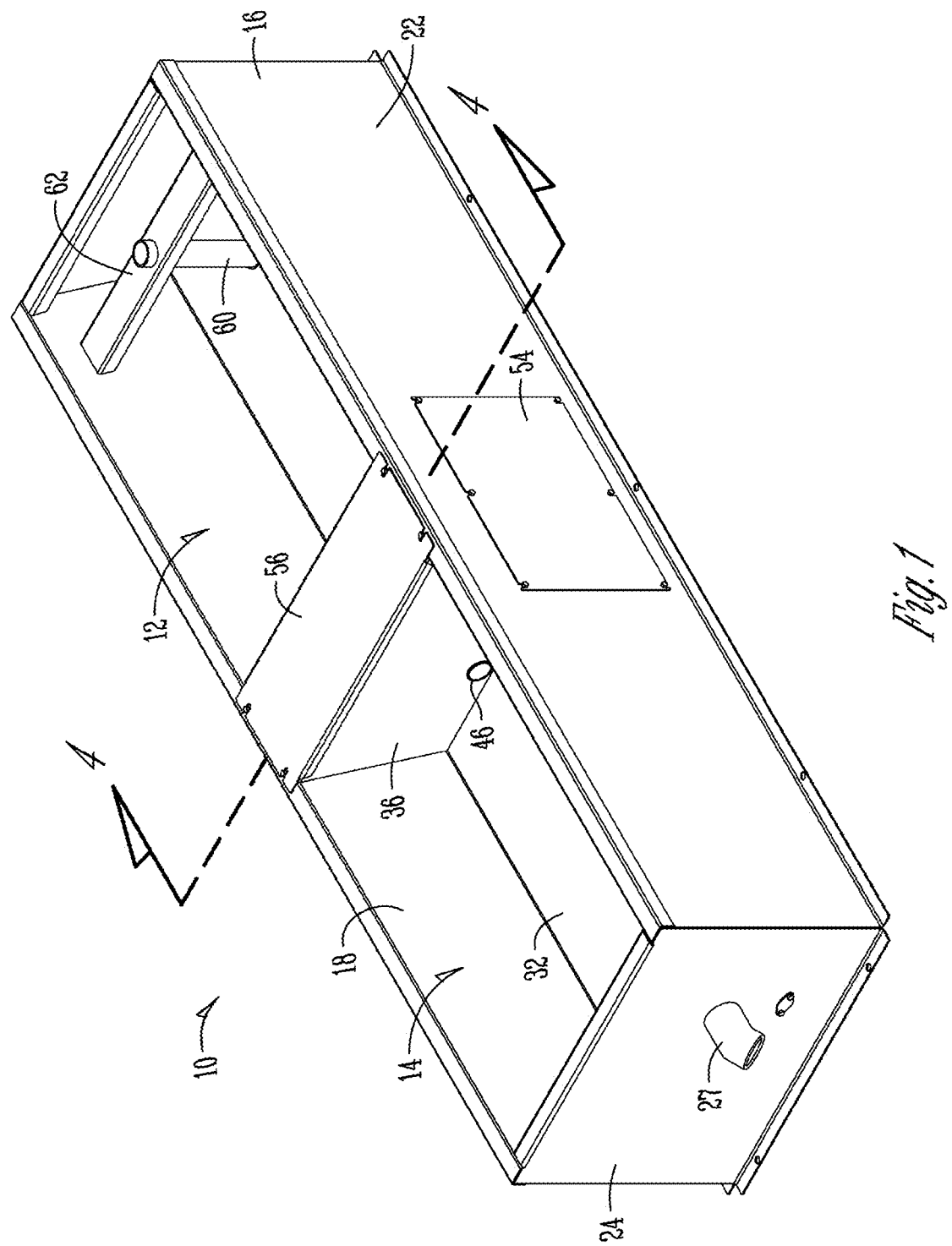
FIG. 1 is a perspective view of a cattle water fountain according to the present invention and having dual drinking stations.
Figure 2:
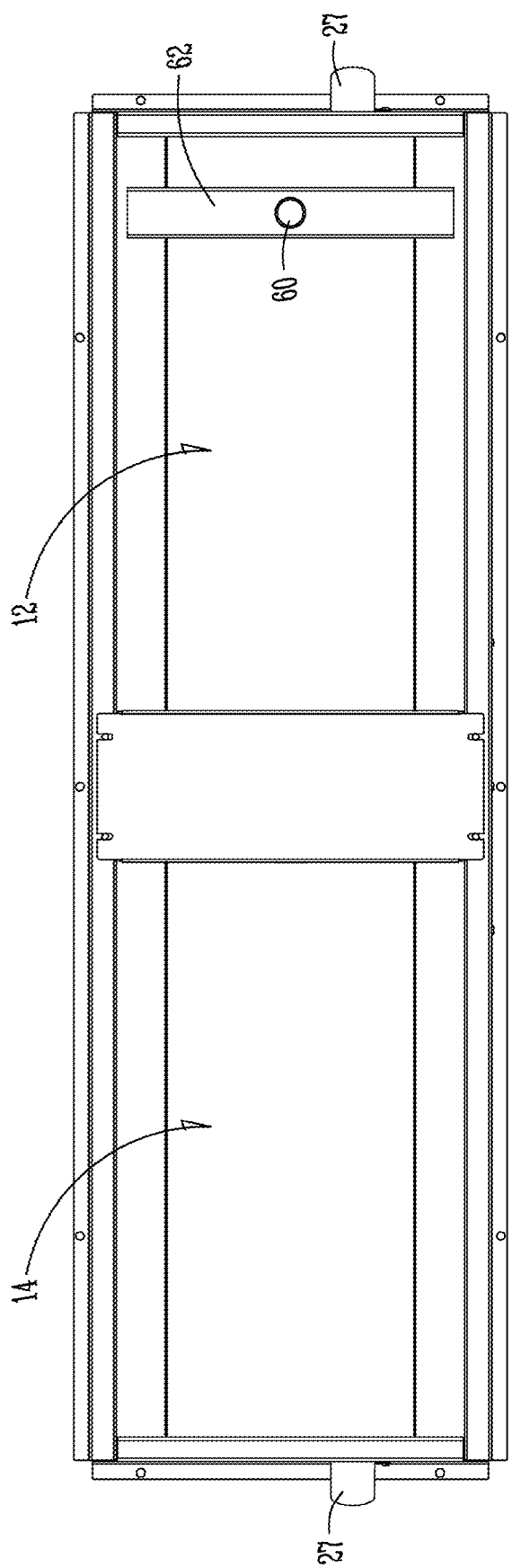
FIG. 2 is a top plan view of the fountain shown in FIG. 1.
Figure 3:
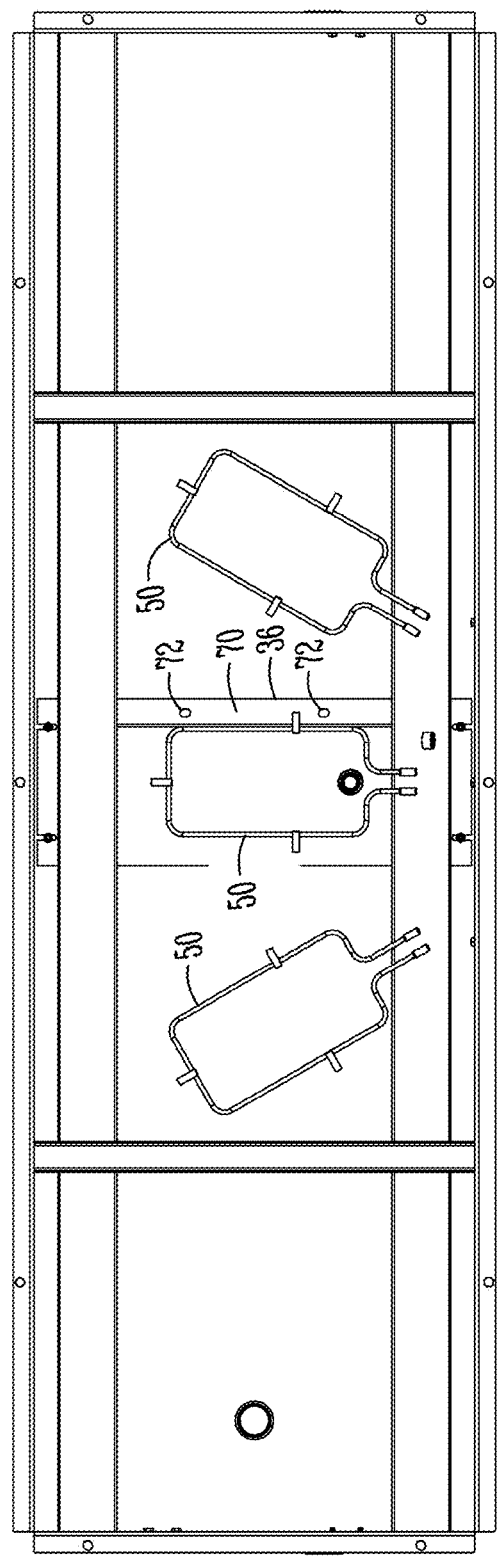
FIG. 3 is a bottom plan view of the water fountain shown FIG. 1.
Figure 4:
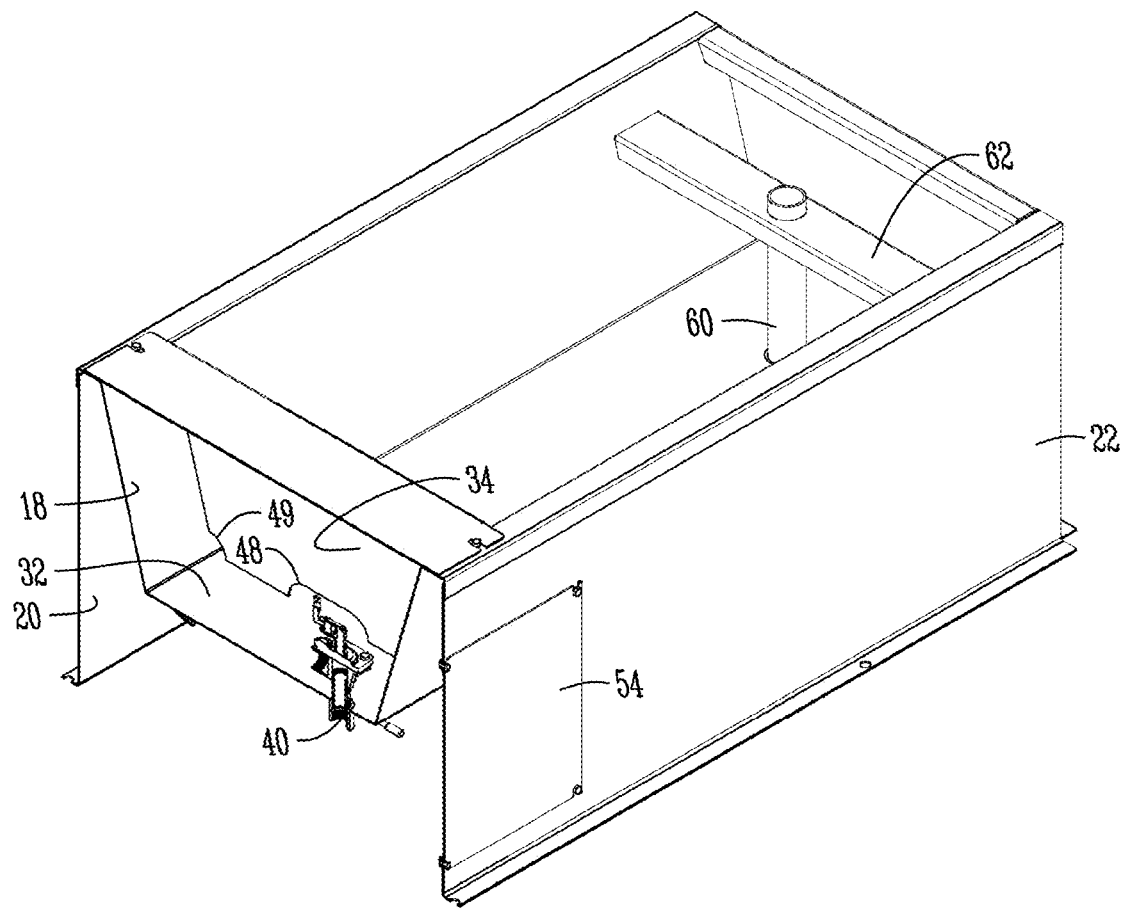
FIG. 4 is a sectional view through the approximate center line of the water fountain, taken along lines 4-4 of FIG. 1.
Figure 5:
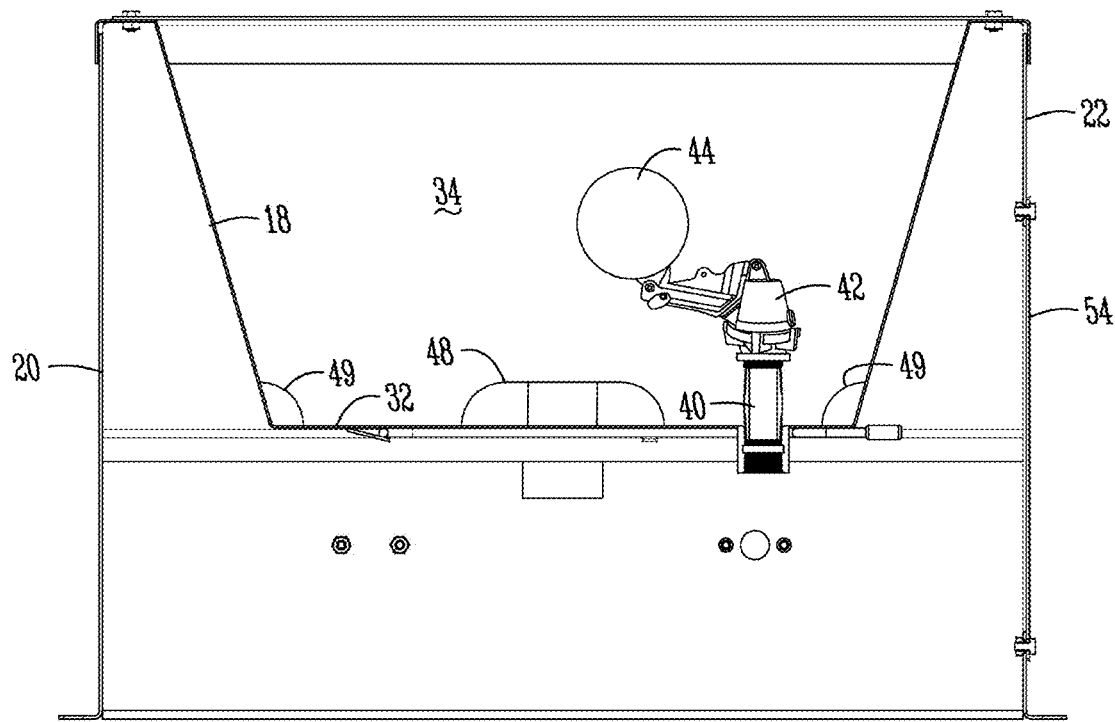
FIG. 5 is an elevation view from the sectioned end shown in FIG. 4.

The fountain 10 includes one or more heating elements 50 mounted on the exterior of the bottom wall 32 of the trough 18, as seen in FIG. 3. Insulation, such as spray foam insulation, is applied to the exterior of the bottom wall 32 of the trough 18, but not over the heating elements 50. The insulation may also be applied to the exterior sides of the trough 18. The interior of the shell 16 may also be lined with foam insulation board or other insulation.

The rear wall 22 of the shell 16 includes an opening 52 with a cover plate 54. When the cover plate 54 is removed, the opening 52 provides access to the heating elements 50 and their electrical connections.

A cap or cover plate 56 is provided on top of the interior walls 34, 36, and can be removed so as to provide access to the waterline 40, valve 42, and float 44, for example for maintenance or repair work. Gaining access to the waterline 40 is achieved thru the access door 54 on the side of the fountain. Gaining access to the valve & float is thru the top cover 56.

In use, water from the inlet line 40 fills both drinking stations 12, 14 when temperatures are above a predetermined value, such as 23 degrees, to a desired depth so cattle can drink from both stations. When the weather turns cold and the cattle consume less water, a plug can be provided in the opening 46 of the plate or wall 44, such that water is only supplied to the first drinking station 12, while the second drinking station 14 remains dry. This cold weather conservation saves energy costs, since a smaller volume water is being heated by the elements 50.

A thermostat 58 is mounted in the trough 18 within the first drinking station 12, at a location spaced above the bottom wall 32 of the trough 18, and located on the side closest to the valve and on the access door side. Preferably, the thermostat 58 is just below the level of water that actuates the valve 42 to introduce additional water into the drinking station 12. Thus, the thermostat 58 senses the water temperature at a higher level, and at a lower temperature, than the water at the bottom of the tank near the heating elements 50. Thus, the thermostat 58 will actuate the heating elements 50 before the surface of the water begins to freeze.

As shown in FIGS. 3 and 6, the wall 36 is a double wall construction with an air gap 70 therein, which forms a radiant heat barrier in the fountain for isolating the outside ambient temperature from the water temperature in the trough 18. The bottom wall of the air chamber 70 has one or more holes 72 (FIG. 3) which allows air in the bottom of the fountain 10, heated by the heating elements 50 and by ground heat, to pass upwardly into the air chamber 70 and circulate with the cooler air from above, thereby increasing the air temperature in the air chamber or gap 70. This warmer gap 70 provides an additional insulation layer on one end of the drinking station 12, when the drinking station 14 is empty during cold weather.

If electricity is not available to the fountain 10, the trough 18 may include an upstanding pipe 60 having an open upper end and a lower end that is plumbed to a drain line (not shown) or to the ground. As water is supplied to the trough 18, the water will overflow into the pipe 60, so as to provide circulation by a flow of water into the trough, which prevents the water from freezing. A cross bar 62 fixed to opposite sides of the trough 18 stabilizes the pipe 60.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

The invention claimed is:

1. A cattle water fountain, comprising:
   an outer shell having opposite sides, opposite ends, an open top, and an open bottom;
   a trough inside the shell and having opposite sides, an open top and a closed bottom;
   a water inlet extending into the trough to supply water to the trough;
   a divider in the trough extending between the opposite sides to defining a pair of drinking chambers both accessible to cattle via open upper ends on each chamber for drinking water from both chambers, and the divider having a passageway providing fluid communication between the drinking chambers;
   heating elements adjacent the bottom of the trough; and
   a plug to selectively close the passageway such that one drinking chamber can be closed from the water inlet while the other drinking chamber remains open to receive water from the water inlet for drinking; and a water circulation pipe mounted in the trough and having an upper open end residing adjacent a normal water level in the trough to allow water to drain from the trough.

2. The cattle water fountain of claim 1 wherein the water inlet is adjacent the bottom of the trough.

* * * * *